Jan. 20, 1959     E. A. BELMONT     2,869,406
HOLE DE-BURRING TOOL
Filed Aug. 7, 1956
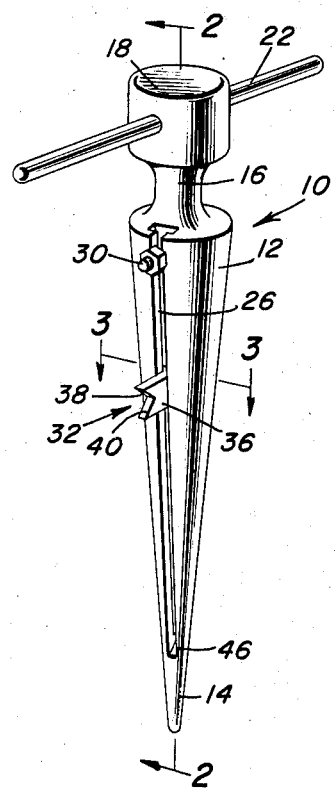
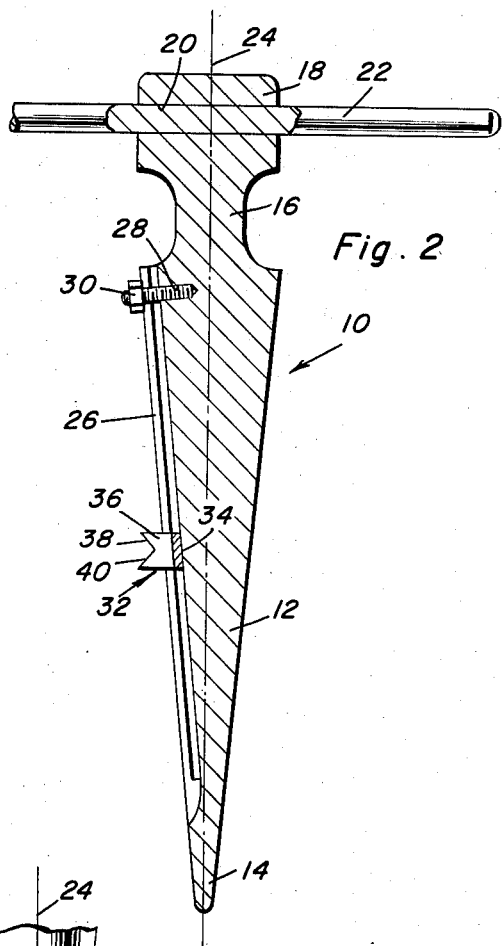
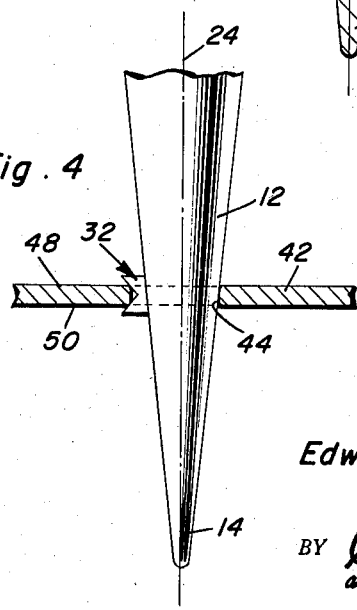
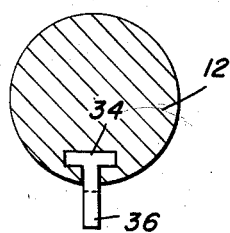
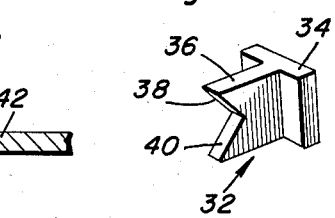
Edward A. Belmont
INVENTOR.

2,869,406
HOLE DE-BURRING TOOL

Edward A. Belmont, Granada Hills, Calif.

Application August 7, 1956, Serial No. 602,614

1 Claim. (Cl. 77—73.5)

This invention relates generally to hand tools and is more particularly concerned with a de-burring tool which can be readily utilized in de-burring newly drilled, punched, etc. holes simultaneously on both sides of the material in which the hole is formed.

A primary object of invention is to provide a de-burring tool usable in holes of varying diameters, wherein the tool includes a rotatable cutter blade portion disposed laterally from a tapered support shank wherein the cutter blade portion is disposed on opposite sides of the material in which a hole to be de-burred is formed wherein both edges of the hole are deburred simultaneously.

A more specific object of invention in conformance with that set forth above is to provide a tapered pin or support shank member reciprocably supporting a laterally extending de-burring tool element having a pair of converging blade portions extending toward the longitudinal axis of the pin or support shank member, and including means for rotating the pin or shank member about its longitudinal axis wherein the converging cutter blade portions are disposed on opposite sides of the material in which the hole to be de-burred has been formed.

A further object of invention in conformance with that set forth above is to provide a de-burring tool of the character set forth which is readily and economically manufactured, easily used, and highly efficient and practical for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the novel de-burring tool;

Figure 2 is an enlarged longitudinal sectional view taken substantially on line 2—2 of Figure 1;

Figure 3 is an enlarged horizontal sectional view taken substantially on line 3—3 of Figure 1;

Figure 4 is an enlarged fragmentary side elevational view showing the novel de-burring tool in position in a hole to be de-burred; and Figure 5 is an enlarged perspective view of the de-burring element of the novel tool.

Referring to the drawings, the novel de-burring tool is indicated generally at 10, said tool including a tapered body member or shank member 12 having a lower sharpened end portion 14, and an upper neck portion 16 terminating in an enlarged upper end portion 18 having a transverse bore 20 extending therethrough, said bore 20 having a transverse handle 22 suitably secured therein wherein the tapered pin or body member may be rotated about its longitudinal axis indicated at 24.

The tapered body 12 has extending in the outer surface thereof a guide slot 26 having a T-shaped cross section, and extending transversely through the slot 26 in a suitable tapped portion 28 in the body 12 is an abutment screw 30 for retaining in the slot 26 a reciprocable de-burring tool element indicated generally at 32 which is reciprocably supported in the slot 26.

The de-burring tool element comprises a base portion 34 and a transverse body portion 36 defining a T-shaped cross section, see Figure 5, conforming to that of the slot 26, the body portion extending laterally from the tapered body 12 and terminating in a pair of cutter blade portions 38 and 40 which converge toward the longitudinal axis 24 of the tapered pin or body member 12 and forming a V-shaped cutting notch in the tool.

Considering Figure 4, a piece of material 42 has a newly made hole 44, the de-burring tool element 32 moved to the lowermost position 46 of the slot 26 and extended on the opposite sides 48 and 50 of the material 42 whereafter the body member is moved downwardly in the position shown in Figure 4 so that the tapered body member 12 is in engagement with the hole 44 opposite the cutter element 32 whereafter the body 12 is rotated as previously described about its longitudinal axis and any burrs existing around the hole 44 will be cut off by the blade portions 38 and 40.

The cutter element 32 may be readily removed for replacement or resharpening by removing the abutment screw 30 whereafter the cutter element may be readily slid out of the slot 26.

Various positional directional terms such as "bottom," "top," etc. are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A de-burring tool comprising an elongated solid shank portion tapered from end-to-end thereof for wedging in a hole in a piece of metal and having a longitudinal groove in one side thereof and a smooth opposite side, a tool longitudinally slidably mounted in said groove and having a pair of cutter blade portions extending out of said groove and forming a V-shaped cutter notch for straddling the edge of a hole, said groove and smooth side of the shank coacting when the shank portion is wedged into a hole with said notch straddling the edge of a hole to slide the tool in the groove and cam the tool toward the edge of a hole to wedge the notch against the edge of a hole, a screw in one end of said groove limiting sliding of said tool in one direction, the other end of said groove being closed to limit sliding of the tool in the opposite direction and a transverse handle on one end of the shank for rotating the shank portion in a hole to revolve the tool around a hole.

References Cited in the file of this patent

UNITED STATES PATENTS

| 1,346,105 | Bosse | July 13, 1920 |
| 2,461,431 | Millheam | Feb. 8, 1949 |
| 2,649,001 | Fennell | Aug. 18, 1953 |

FOREIGN PATENTS

| 426,953 | Italy | Nov. 10, 1947 |